US010539201B2

(12) United States Patent
Griffin et al.

(10) Patent No.: US 10,539,201 B2
(45) Date of Patent: Jan. 21, 2020

(54) SEMI-ACTIVE TUNED MASS DAMPER TO ELIMINATE LIMIT-CYCLE OSCILLATION

(71) Applicant: The Boeing Company, Chicago, IL (US)

(72) Inventors: Steven F. Griffin, Kihei, HI (US); Stefan P. Hovik, Fall City, WA (US)

(73) Assignee: The Boeing Company, Chicago, IL (US)

(*) Notice: Subject to any disclaimer, the term of this patent is extended or adjusted under 35 U.S.C. 154(b) by 257 days.

(21) Appl. No.: 15/810,793

(22) Filed: Nov. 13, 2017

(65) Prior Publication Data

US 2019/0145481 A1    May 16, 2019

(51) Int. Cl.
| | |
|---|---|
| F16F 7/04 | (2006.01) |
| B64C 17/00 | (2006.01) |
| G01M 9/04 | (2006.01) |
| F16F 7/10 | (2006.01) |
| F16F 15/02 | (2006.01) |
| F16F 7/104 | (2006.01) |

(52) U.S. Cl.
CPC .......... *F16F 7/1011* (2013.01); *B64C 17/00* (2013.01); *F16F 7/104* (2013.01); *F16F 15/022* (2013.01); *G01M 9/04* (2013.01); *F16F 2222/08* (2013.01); *F16F 2228/04* (2013.01); *F16F 2230/08* (2013.01); *F16F 2230/18* (2013.01)

(58) Field of Classification Search
None
See application file for complete search history.

(56) References Cited

U.S. PATENT DOCUMENTS

| | | | | |
|---|---|---|---|---|
| 5,816,373 | A * | 10/1998 | Osterberg ............ | F16F 7/1017 188/380 |
| 5,884,736 | A * | 3/1999 | Burdisso ................ | F16F 7/1011 188/379 |
| 6,476,702 | B1 * | 11/2002 | Hartwig ................ | F16F 7/1005 335/220 |
| 7,681,701 | B2 * | 3/2010 | Mikonaho ............... | F16F 7/104 188/317 |

(Continued)

OTHER PUBLICATIONS

Ruzicka, Jerome E. , "Active Vibration and Shock Isolation", Barry Controls Div., Barry Wright Corp., Downloaded from SAE International by Reprints Desk Document Delivery Account, Thursday, Jul. 13, 2017, pp. 2872-2886.

(Continued)

*Primary Examiner* — Natalie Huls
*Assistant Examiner* — Jermaine L Jenkins
(74) *Attorney, Agent, or Firm* — Kwan & Olynick LLP (57) ABSTRACT

Methods of damping vibrations in a host structure are described. In one embodiment, the vibrations can be damped using a tuned mass damper. The tuned mass damper can include a suspended mass with magnets which is configured to move in response to current being applied to a voice coil. The tuned mass damper can damp vibrations resulting from an external load applied to the host structure, such as an external aerodynamic load. In one embodiment, the tuned mass damper can be mounted within a wind tunnel model undergoing transonic testing. The tuned mass damper can be operated to limit potentially destructive vibrations which can occur during testing.

22 Claims, 11 Drawing Sheets

(56) References Cited

U.S. PATENT DOCUMENTS

| | | | |
|---|---|---|---|
| 8,616,536 B2* | 12/2013 | Kim | F16F 7/1011 |
| | | | 188/267 |
| 9,172,277 B2* | 10/2015 | Genderjahn | F16K 31/082 |
| 9,541,149 B2* | 1/2017 | McGranahan | F16F 9/34 |
| 9,587,699 B1 | 3/2017 | Griffin et al. | |
| 10,309,867 B2* | 6/2019 | Hovik | G01M 9/04 |
| 2016/0319895 A1* | 11/2016 | Griffin | F16F 7/104 |

OTHER PUBLICATIONS

Zuo, Lei et al., "Dual-Functional Energy-Harvesting and Vibration Control: Electromagnetic Resonant Shunt Series Tuned Mass Dampers", J Vib Acoust., 135(5), Oct. 2013, 16 pgs.

* cited by examiner

SEMI-ACTIVE TUNED MASS DAMPER TO ELIMINATE LIMIT-CYCLE OSCILLATION

TECHNICAL FIELD

This disclosure generally relates to structural damping in aerospace structures. More specifically, this disclosure relates to damping structural resonances using a tuned mass damper (TMD) including a voice coil/magnet combination.

BACKGROUND

During development, models of a jet airplane are tested in wind tunnels. Often, the models are tested at sufficient speeds such that the speed of sound is locally exceeded at specific locations on the model. In wind tunnel tests, structural dynamic behavior has been observed resulting from shock-induced trailing edge separation causing limit-cycle oscillations at transonic Mach numbers and high angles of attack. This structural dynamic behavior has resulted in failure of model components and departure of hardware from the test section, causing extensive facility damage. In view of the new methods and apparatus are needed for reducing destructive structural dynamic behavior of wind tunnel models during transonic testing.

SUMMARY

Methods of damping vibrations in a host structure are described. In one embodiment, the vibrations can be damped using a tuned mass damper. The tuned mass damper can include a suspended mass with magnets which is configured to move in response to current being applied to a voice coil. The tuned mass damper can damp vibrations resulting from an external load applied to the host structure, such as an external aerodynamic load.

One aspect of the invention can be generally characterized as a system. The system can include a host structure, a tuned mass damper and a control system. The host structure can be configured to receive a periodic external load. The tuned mass damper can be coupled to the host structure. The control system can be configured to change movement characteristics of the suspended mass.

The tuned mass damper can include a frame, a voice coil configured to receive current, a suspended mass including a magnet configured to move in response to the current moving through the voice coil, a suspension system which couples the suspended mass to the frame and a displacement sensor configured to measure an amount of displacement of the suspended mass. The control system can be configured to receive sensor data from the displacement sensor and use the displacement sensor data to control the current in the voice coil to damp structural vibrations associated with the host structure.

In a particular embodiment, an aerodynamic system used for wind tunnel testing of a wind tunnel model can be provided. The aerodynamic system can include 1) a wind tunnel model configured to receive an aerodynamic load, 2) tuned mass damper mounted within an interior of the wind tunnel model and 3) a control system for the tuned mass damper. The tuned mass damper can include i) a frame, ii) a voice coil configured to receive current, iii) a suspended mass including a magnet configured to move in response to the current moving through the voice coil; iv) a suspension system which couples the suspended mass to the frame; and v) a displacement sensor configured to measure an amount of displacement of the suspended mass. The control system can be configured to receive sensor data from the displacement sensor and use the displacement sensor data to control the current in the voice coil to damp structural vibrations associated with the wind tunnel model.

Another aspect of the invention can be generally characterized as a method of testing an aerodynamic system. The method can include 1) operating a wind tunnel including a wind tunnel model mounted to a support system in the wind tunnel to generate air flow over the wind tunnel model where the wind tunnel model includes a tuned mass damper mounted within the interior of wind tunnel model; and 2) controlling the tuned mass damper during wind tunnel tests to damp structural vibrations in the wind tunnel model. In one embodiment, the wind tunnel can be configured to generate transonic flow over the wind tunnel model. The tuned mass damper can be configured to respond to resonance frequencies that change as the velocity changes during the wind tunnel tests.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

Methods of damping vibrations in a host structure are described. In one embodiment, the vibrations can be damped using a tuned mass damper. The tuned mass damper can include a suspended mass with magnets which is configured to move in response to current being applied to a voice coil.

A displacement sensor can be coupled to the tuned mass damper and used to measure a displacement of the suspended mass. A control system can be configured to receive sensor data from the displacement sensor. In one embodiment, the control system can use feedback control based upon the sensor data to determine a current to apply to voice coil and hence control movement of the suspended mass as a function of time.

In particular embodiment, the host structure can be an aerodynamic structure, such as a wing on an airplane or a wind tunnel model. The tuned mass damper can be mounted within the aerodynamic structure. In one embodiment, the tuned mass damper can be used to damp excitations from aerodynamic loads at a resonant frequency associated with the aerodynamic structure. For example, the tuned mass damper can be used to damp structural excitations associated with transonic flow over a wind tunnel model during wind tunnel testing.

Figure 1:
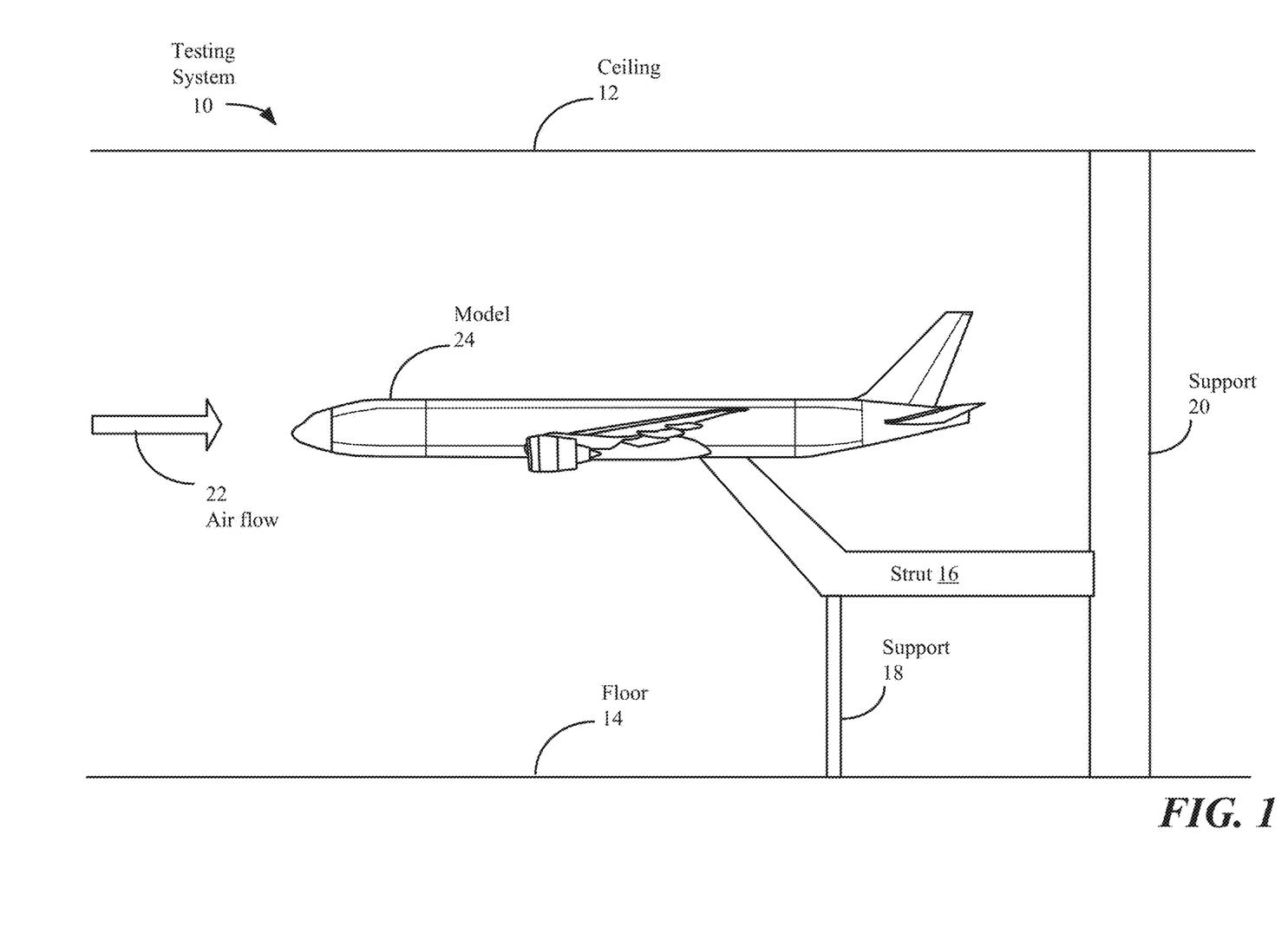
FIG. 1 is a side view illustrating an airplane model in a wind tunnel, according to one aspect of the present disclosure.

In more detail, a wind tunnel model in a wind tunnel capable of generating transonic flow is described with respect to FIG. 1. With respect to FIGS. 2A and 2B, wind tunnel models including a tuned mass damper are discussed. With respect to FIG. 3, a tuned mass damper including a voice coil and suspended mass is described. With respect to FIG. 4, a control system for a tuned mass damper is described. With respect to FIGS. 5A-6C, an example of using a tuned mass damper on a wind tunnel model is described. With respect to FIG. 7, a method of utilizing a tuned mass damper to damp vibrations on a host structure is discussed. Finally, with respect to FIGS. 8 and 9, methods of applying the methods and apparatus to the design and operation of an aircraft are described.

FIG. 1 is a side view illustrating an aerodynamic testing system 10. The aerodynamic system 10 includes an airplane model 24 in a wind tunnel having a ceiling 12 and floor 14. The ceiling 12 and floor 14 form a portion of a test chamber. Within the test chamber, the model 24 is mounted to a strut 16. The strut 16 is supported by a supports 18 and 20, which forms a cantilever system. The wind tunnel is configured to send air flow 22 over the model 24 in the direction indicated by the arrow.

In one embodiment, the wind tunnel can be configured to generate transonic Mach numbers over the model 24. In wind tunnel tests, dynamic behavior has been observed resulting from shock-induced trailing edge separation causing limit-cycle oscillations at transonic Mach numbers and high angles of attack. This dynamic behavior has resulted in failure of model components and departure of hardware from the test section, causing extensive facility damage.

Limit cycle oscillation behavior can occur when the aerodynamic model, such as 24, is supported by a cantilever system such as the lower-swept strut 16. The strut 16 can be mounted to a pitch pod that is connected to the tunnel, and interfaces with the aerodynamic model 24 through an internal balance which measures aerodynamic loads. As angle-of-attack of the model 24 is increased in the transonic Mach range, a sudden-onset oscillatory behavior can occur at the system natural frequency. The oscillatory behavior can have a pitching mode shape.

The oscillatory behavior can result from trailing edge pressure divergence at certain angles of attack on the wing, which causes flow separation. This divergence corresponds to a large forward shift of the upper surface main shock boundary with increasing angle of attack. This shift can also be characterized by a nose-down pitching moment, which results in a reduced angle of incidence. The downward shift can result in re-attachment of the flow, which then reverses the pitching moment and drives nose-up motion.

The oscillatory motion can overshoot the neutral position due to stored elastic energy during the down stroke, and then, the cycle can repeat. On a cantilevered support system, significant changes in wing incidence angle are possible due to system elasticity. It is this resonant system mode which can be excited by such limit cycle oscillation events.

Figure 2A:
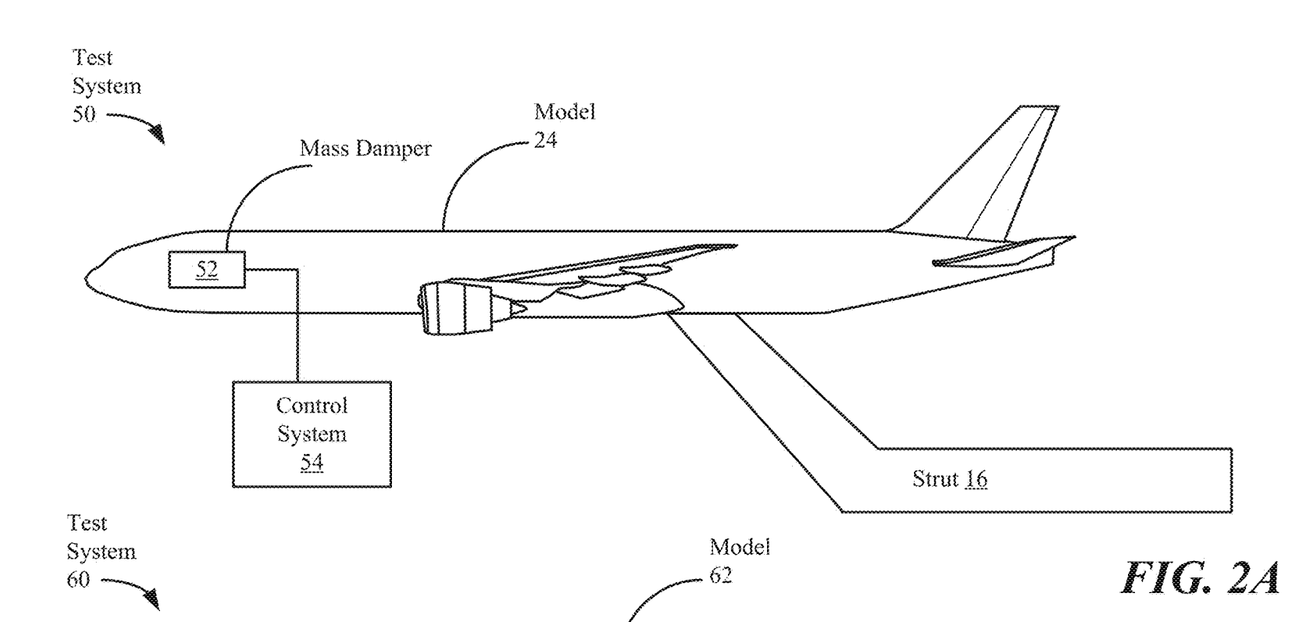
FIGS. 2A and 2B is a side view of a wing and a wing section in a wind tunnel where each includes a tuned mass damper, according to one aspect of the present disclosure.
Figure 2B:
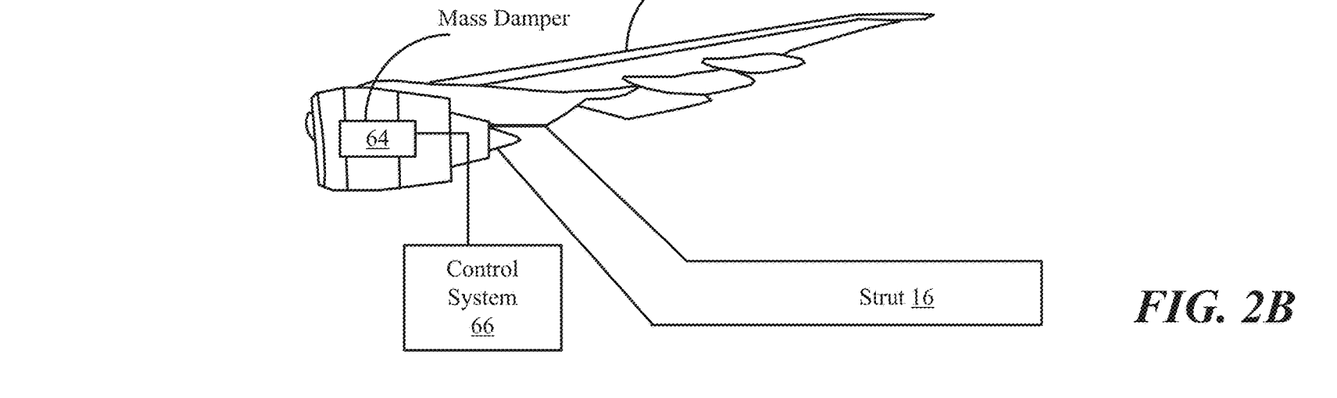

FIGS. 2A and 2B are side views of testing systems 50 and 60. In testing system 50, a wind tunnel model 24 is coupled to a strut 16. The wind tunnel model is a model of an airplane. The model and strut 16 can be mounted within a wind tunnel, such as but not limited to a transonic wind tunnel. A tuned mass damper 52 is shown mounted within in an interior of the model 24. The tuned mass damper is mounted forward of the wing.

In this example, the tuned mass damper is mounted forward of the wing near a nose of the model. The tuned mass damper 52 can be placed in this location to help damp vibrations associated with pitch. In other embodiments, the tuned mass damper can be mounted in other locations within the model to help damp another type of resonant frequency.

A control system 54 is coupled to the tuned mass damper 52. The control system 54 can receive sensor data from the tuned mass damper and send control signals, such as current from an amplifier to the tuned mass damper. In one embodiment, the control system 54 can be located remotely from the tuned mass damper. For example, wires to and from the control system 54 can be run through the model, through the strut 16 to a location outside a test chamber associated with the wind tunnel. In other embodiments, all or a portion of the control system (see FIG. 4 for more details of the control system) can be mounted within an interior of a model.

In alternate embodiments, one or more tuned mass dampers and control systems, such as 52 and 54, can be used to control vibrations on a host structure, such as an airborne platform. In this example, the tuned mass dampers and control systems can be mounted within host structure, such an aircraft including the airborne platform. The tuned mass dampers and control systems can be used to control vibrations, which can occur during flight.

In FIG. 2B, test testing system 60 is shown. In testing system 60, a wind tunnel model 62 is coupled to a strut 16. The wind tunnel model 62 is a model of an airplane wing including a mounted engine. The model 62 and strut 16 can be mounted within a wind tunnel, such as but not limited to a transonic wind tunnel.

A tuned mass damper 64 is shown mounted within in an interior of the model 62. The tuned mass damper is shown in mounted within the mounted engine. In other embodiments, the tuned mass damper can be mounted within the wing portion of the model 62. A control system 66 is shown coupled to the tuned mass damper 64.

In FIGS. 2A and 2B, tuned mass dampers, 52 and 64, can add large amounts of damping where there is large motion at a given resonant frequency associated with one of the models 24 or 62 and support system including strut 16 during wind tunnel tests. The resonant frequency can change as the air speed changes, which is not constant during the wind tunnel tests. The control systems 54 and 66 can be configured to adapt to the changing resonant frequencies and adapt the amount of damping output from the tuned mass dampers, 52 and 64 accordingly. As described above, this damping system can also be applied to damp structural vibrations on a flight system, such as an airborne platform.

Figure 3:
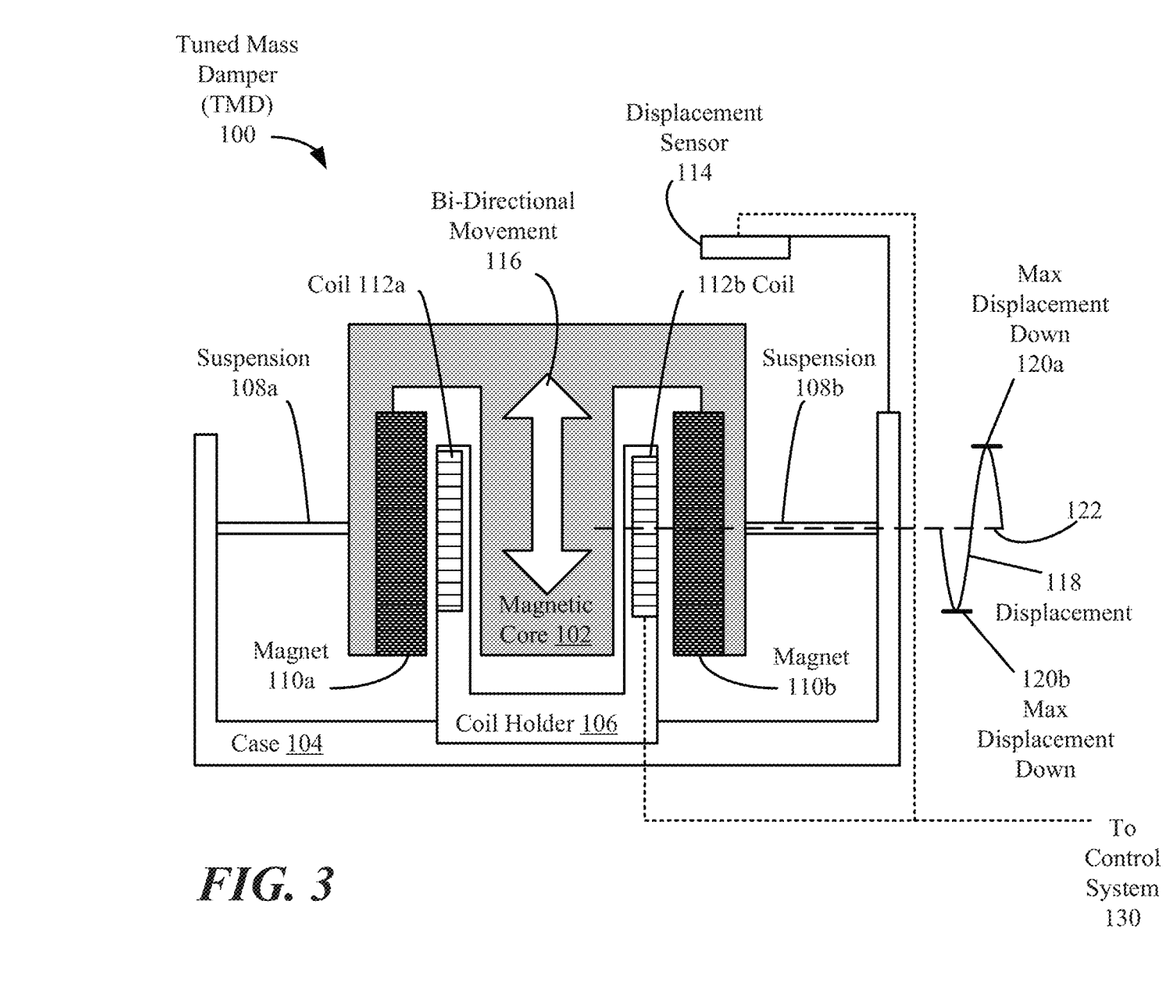
FIG. 3 is a side view of a tuned mass damper, according to aspects of the present disclosure.

Next, details of a tuned mass damper and a control system are described. FIG. 3 is a side view of a tuned mass damper (TMD) 100. The TMD 100 can include a wire coil arranged within a radially oriented magnetic field. In FIG. 3, a wire coil, having cross sections 112*a* and 112*b*, is shown disposed within a tubular magnet arrangement having cross sections, 110*a* and 110*b*. The tubular magnet arrangement can be formed from a single magnet or a plurality of magnets. The single magnet or a plurality of magnets can be arranged such that the magnets facing the coil all have the same polarity. A magnetic core 102 of ferromagnetic material can be set along the axial centerline of the wire coil and can be joined to the magnets to form a magnetic circuit.

When current is passed through the wire coil having cross sections 112*a* and 112*b*, a force is generated. The force can be generated along the axis of the wire coil. The force can cause a relative motion between the magnetic core 102, including the magnets, and the coil. The direction of the force depends on the direction of the current flow in the wire coil. Thus, the direction of the current can be controlled to provide bi-directional movement 116. The current, as described in more detail to FIG. 4, can be provided from an amplifier under control of control system 130.

In one embodiment, a case 104 can be provided. The magnets and magnetic core 102 can be mounted to the case 104 via a suspension system. The suspension system can allow the magnetic core 102 to move relative to the case 104 and the coil holder 106 in response to currents received in the wire coil.

In another embodiment, the magnets and magnetic core 102 can be rigidly fixed to the case 104. In this embodiment, the coil holder 106 can be coupled to a suspension system. The suspension system can allow the coil holder 106 to move relative to the magnetic core 102 and the case 104.

As described above, the coil holder 106 can be fixed to the case 104 and the magnetic core 102 can be suspended via a suspension system or the magnetic core 102 can be fixed to the case 104 and the coil holder 106 can suspended via the suspension system. In particular embodiments, additional mass can be added to the suspended component. The amount of additional mass that is added can depend on a weight of the host structure. Typically, as the host structure mass increases, the amount of additional mass which is added can increase to provide a desired amount of damping. The additional mass and the suspended component can act as a suspended mass. A control system can control movement characteristics of the suspended mass to provided damping.

The suspension system can utilize a plurality of flexible members to support a suspended mass, such as the magnetic core 102 and magnets. For example, a flexible member can be formed from elastic flexures, such as flexible tubing, which couple the suspended mass to the frame. In another example, a flexible membrane can be utilized. Suspensions 108*a* and 108*b* can be cross sections of flexible members or a flexible member. In particular embodiments, one or more of the flexible members can include or can be coupled to a springs. The springs can be used to adjust a frequency response of the system. In particular, the resonant frequency of the TMD 100 can be changed depending on a stiffness of the flexible members and/or the springs.

As an example, a Dayton Audio Puck tactile transducer TT25-16 (Dayton Audio, Springboro, Ohio) can be utilized as a TMD with a wind tunnel model. The TT25-16 is a small tactile transducer having a diameter of 85.7 millimeters and a depth of 25.4 millimeters. The nominal frequency response is twenty to eighty Hz. But, the response can be made to go lower. The voice coil diameter is twenty five millimeters. The resonance frequency is forty Hz. The total weight of the TT25-16 transducer is about three hundred forty grams. The power handling is twenty watts RMS with a maximum of thirty watts.

In one embodiment, a displacement sensor 114 can be used to measure an amount of movement of the suspended magnetic core 102. In one embodiment, an amount of movement relative to the case 104 can be measured. Some examples of a displacement sensor 114 include but are not limited to a Hall Effect sensor, an inductive sensor, a laser sensor and an eddy current sensor. In one embodiment, the displacement sensor 114 can be configured to send data to a control system 130.

Using the data from displacement sensor 114, the control system 130 can control the current sent to the wire coil which is used to generate the movement of the magnetic core 102. For example, the control system 130 can be configured to cause the magnetic core to oscillate about line 122 with a displacement curve 118. The displacement curve 118 is shown as a sine wave with a maximum and a minimum displacement 120*a* and 120*b* at a frequency. As will be described in more detail as follows with respect to FIGS. 4-6C, the control system 130 can be configured to control the frequency at which the mass of the system (the magnetic core 102, the magnets and any additional mass) oscillates.

Figure 4:
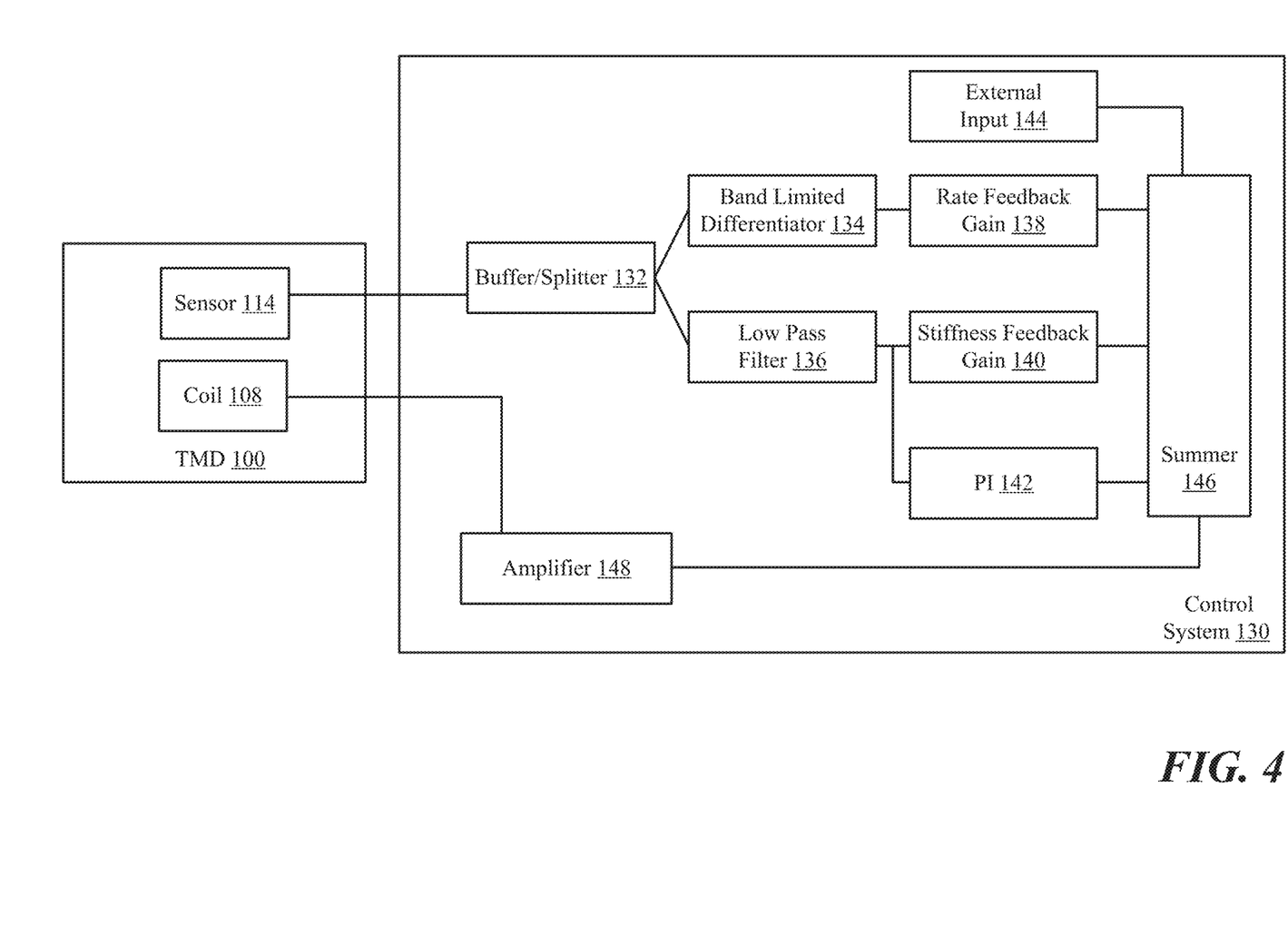
FIG. 4 is a block diagram of a control system for a tuned mass damper, according to one aspect of the present disclosure.

FIG. 4 is a block diagram of a control system 130 for a tuned mass damper, such as TMD 100, described above with respect to FIG. 3. The control system 130 receives sensor data from the displacement sensor 114 in buffer/splitter 132, which buffers and then splits the signal. A first signal is passed to band limited differentiator 134, which is used to determine a rate of movement (velocity). In 138, a gain is applied to the rate and passed to summer 146.

A second signal is passed to the low pass filter 136. The low pass filter 136 reduces noise associated with the sensor data which measures the displacement. The filtered signal is passed to the stiffness feedback gain 140. The stiffness feedback gain 140 applies a gain to the displacement signal and passes it to the summer 146.

The summer generates a signal which is passed to the amplifier 148. The amplifier can then generate a current with a magnitude and direction in response to the signal received from the summer 146. The current can be sent to the voice coil 108. In response, a moving component within the TMD 100, such as a suspended mass, can be moved to provide vibrational damping to the host structure. In another embodiment, the amplifier 148 can be configured to control a voltage across the coil in response to the signal received from the summer 146. The voltage changes can cause the moving component, such as the suspended mass, to move and provide damping to the host structure.

In one embodiment, the control system 130 can include proportional integral (PI) control circuit 142. The PI control circuit 142 can receive a signal from the low pass filter 136 and provides an output to the summer 146. The PI control circuit 142 can be configured to help keep a motion of the moving component in the TMD 100 centered around a line, such as line 122 in FIG. 3. The PI control circuit can be part of a proportional integral loop.

At low frequencies, the PI control circuit 142 can help prevent the moving component within the TMD 100 from bottoming out. For example, in FIG. 3, the PI control circuit 142 can help prevent the magnetic core 102 from impacting the coil holder 106. Without the PI control circuit 142, at low frequencies and also due to sag in the system from gravity, the magnetic core 102 can strike the coil holder 106.

An external input 144 can be coupled to the summer 146. In one embodiment, the external input 144 can be used to tune the control system 130 for the TMD 100. For example, the TMD 100 can be coupled to a host structure, such as a wind tunnel model (see FIG. 2A or 2B.) When the host structure is at rest (no aerodynamic loads), a random signal can be input through external input 144. The random signal can cause the TMD 100 to shake. In response, the wind tunnel model and the TMD 100 can shake. The amount of shaking can be attenuated at particular frequencies. Based upon this information, the resonant frequencies of the TMD 100 and host structure can be determined. This information can be used to tune the gains associated rate feedback 138 and stiffness feedback 140. The gains can be one example of control parameters which effect operation of the TMD 100.

Next, an example of a host structure using a TMD, such as TMD 100 in FIG. 3, is described. In the example, the host structure and the TMD are simulated via finite element analysis. In particular, a TMD is coupled to a thirty eight pound wind tunnel model. The TMD includes a moving component with a mass of ½ pound. The suspension system of the TMD is configured such that the TMD can have a resonant frequency of seven Hertz.

Figures 5A, 5B, 5C:
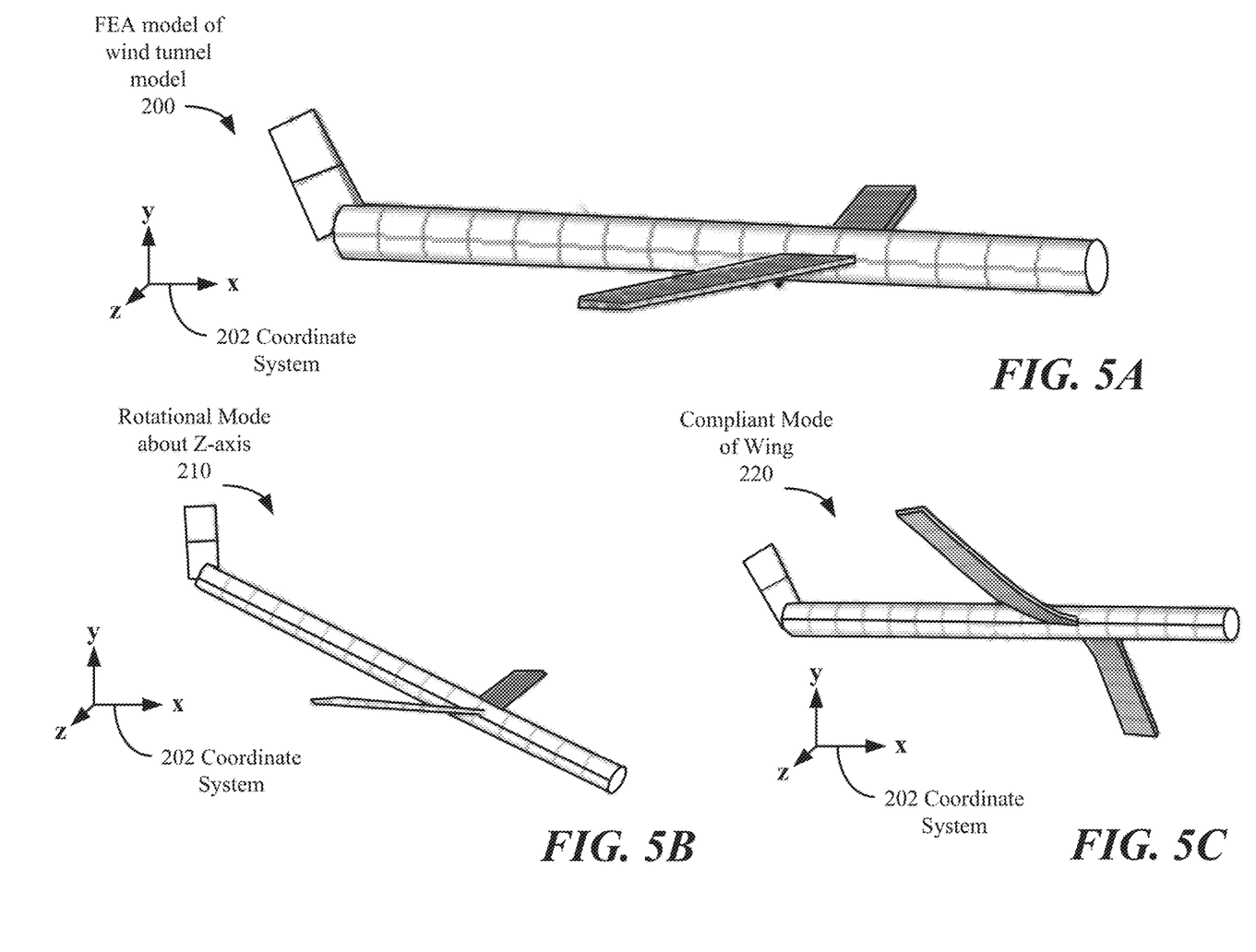
FIGS. 5A, 5B and 5C are perspective views of a finite element analysis (FEA) model of a wind tunnel model, a rotational mode of the FEA model and a compliant mode of a wing of the FEA model, according to one aspect of the present disclosure.

FIGS. 5A, 5B and 5C are perspective views of a finite element analysis (FEA) model 200 of a wind tunnel model, a rotational mode 210 of the FEA model obtained from the simulation and a compliant mode 220 of a wing of a FEA model obtained from the simulation. In FIG. 5A, the FEA model 200 is constrained in all displacement degrees of freedom at its center of gravity and is also constrained in rotation in both the x and y axes in coordinate system 202. The z axis in coordinate system 202 can have a relatively stiff, rotational spring between the model 200 and affixed boundary condition.

A modal analysis of the model 200 can be generated from the simulation. A modal analysis of the model 200 predicts a rigid body rotational mode about the z axis around seven Hz and a first compliant mode of the wing around twenty Hz. These two modes are shown in FIGS. 5B and 5C.

A representation of a TMD (see TMD 100 in FIG. 3) can be located in the nose of model 200. The suspension system can be tuned so that the TMD uncoupled resonance matches the seven Hz resonance of the model 200. With the TMD coupled to the model 200, the rigid body mode of the model 200 at seven Hertz is replaced with two coupled modes at 6.6 Hertz and 7.8 Hertz, respectively. The finite element model 200 can be used to synthesize the frequency response functions with and without the TMD 100. When the TMD is used in the simulation, the TMD 100 can be controlled to provide active damping as described as follows with respect to FIGS. 6A, 6B and 6C.

Figure 6A:
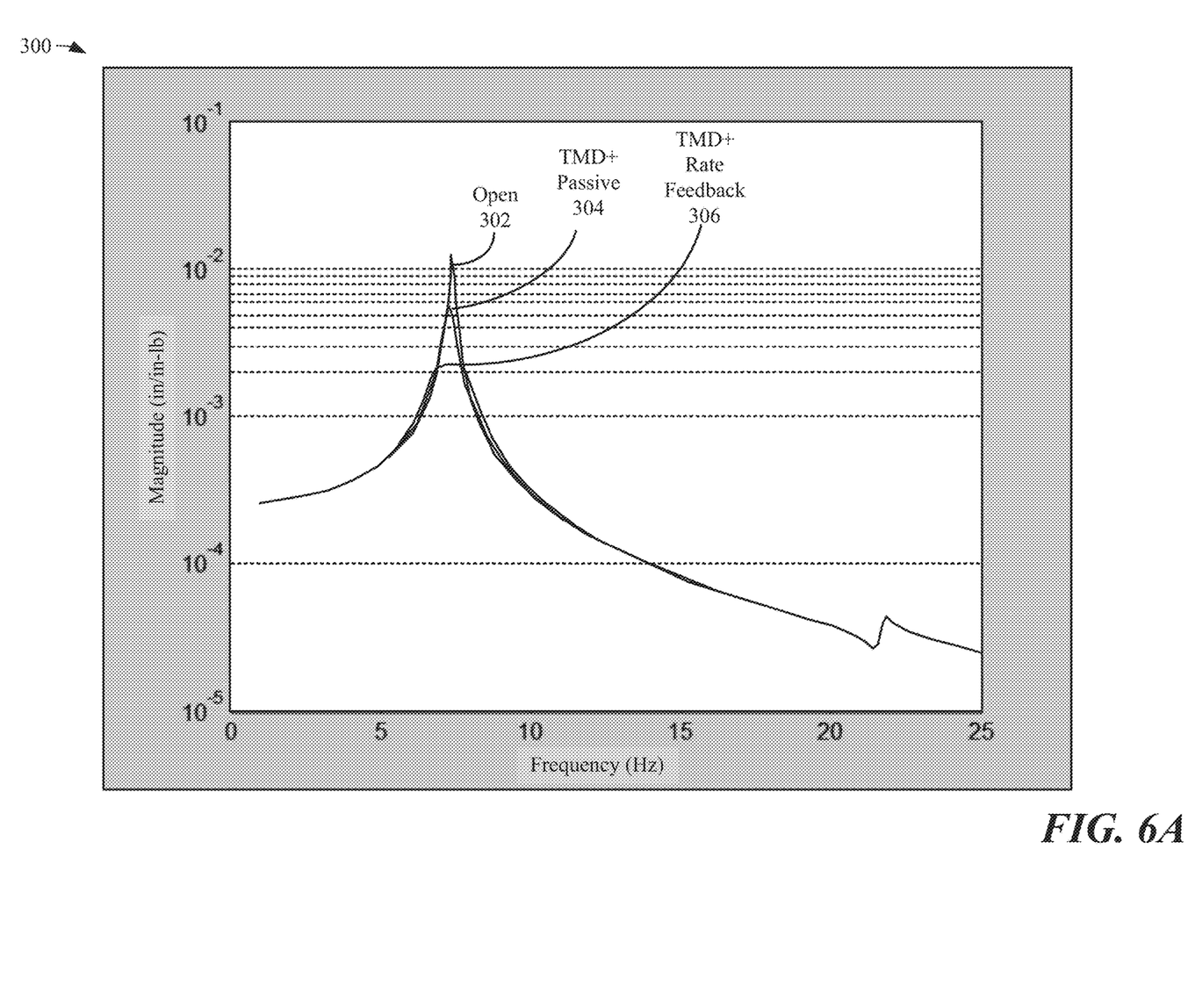
FIGS. 6A, 6B and 6C show damping effects using a tuned mass damper, according to aspects of the present disclosure.

FIG. 6A is a plot of Magnitude (in/in-pound) versus Frequency (Hz). In FIG. 6A, the frequency response functions are the response of the model at the location of the TMD installation in the FEA model 200 due to a z-axis moment input at the center of gravity of the FEA model. As described above, the TMD is installed in the nose of the FEA model 200.

The open curve 302 is the response of the FEA model without the TMD. The TMD+passive case 304 is the response of the TMD and the FEA model 200 without the control system turned on. When the magnets in the TMD move through the voice coil, a back electromotive force (EMF) is generated. The back EMF can add damping to the system. The passive damping of the TMD reduces the peak magnitude.

The TMD+ rate feedback 306 curve assumes the addition of a displacement sensor that measures relative displacement of the moving component of the TMD. The displacement sensor data can be provided to a control system (e.g., FIG. 4) where it is differentiated with gain applied and fed back into the TMD via an amplifier. This approach has the effect of reducing the resonance by 85% of its amplitude as compared to 54% for the TMD+passive case 304.

Figure 6B:
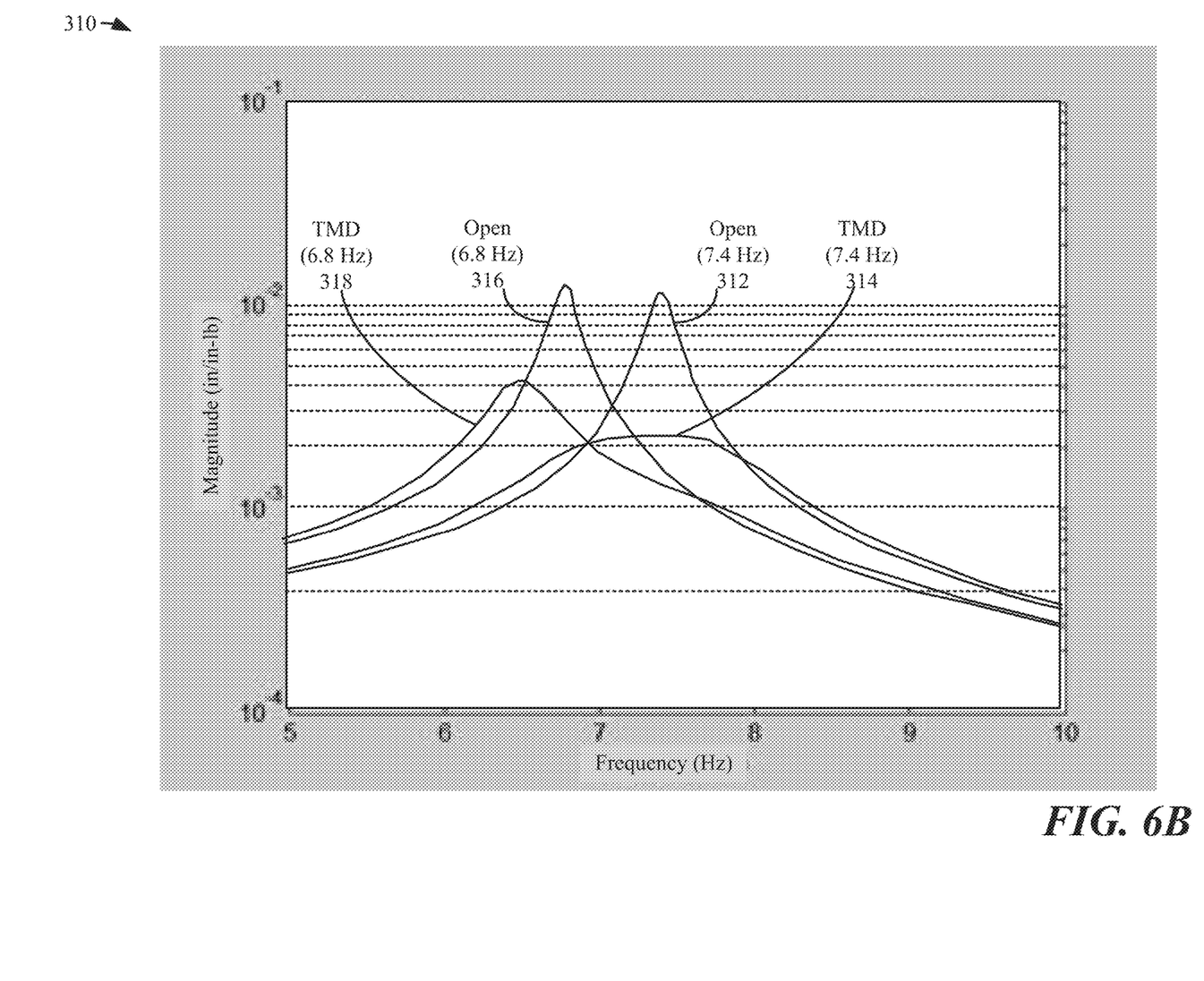

Next, with respect to FIG. 6B flow conditions are compared where the resonant frequency is decreased from 7.4 Hertz to 6.8 Hertz. In wind tunnel tests, the resonant frequency can drop as the flow velocity increases. As described above, two resonant frequencies are associated with the wind tunnel model and the TMD, i.e., 7.8 and 6.6 Hertz. In this example, the TMD is controlled using only rate feedback.

In FIG. 6B, curves, 312 and 316, show the model response without the TMD at 6.8 Hz and 7.4 Hz. Then, the curves 314 and 318 show the model and TMD response where the TMD is controlled with rate feedback only from the displacement sensor. As shown in FIG. 6B, the TMD can lose effectiveness as the frequency of the rigid body mode is decreased with increased flow velocity. Thus, the amount of damping for curve 318 at 6.8 Hz is less than the amount of damping for curve 314 at 7.4 Hz.

In one embodiment, the collocated transfer function of the TMD to its differential response can be configured to sense changes in the frequency of the rigid body mode. Then, rate and stiffness data from the TMD can be fed back at the appropriate gains to again improve performance over a wider range of frequencies. One approach can be to monitor the area under the frequency response curve in a frequency range that extends slightly above and below the resonance. This area can be a good indicator of a change in the frequency of the rigid body mode. This approach can be done instantaneously by continuously measuring the frequency response of the TMD with a low level excitation. Details of this approach, which can be utilized herein, are described in U.S. Pat. No. 9,586,699, by Griffin, et al., issued Mar. 7, 2017, and titled. "Self-Tuning Mass Dampers," which is incorporated by reference in its entirety and for all purposes.

Figure 6C:
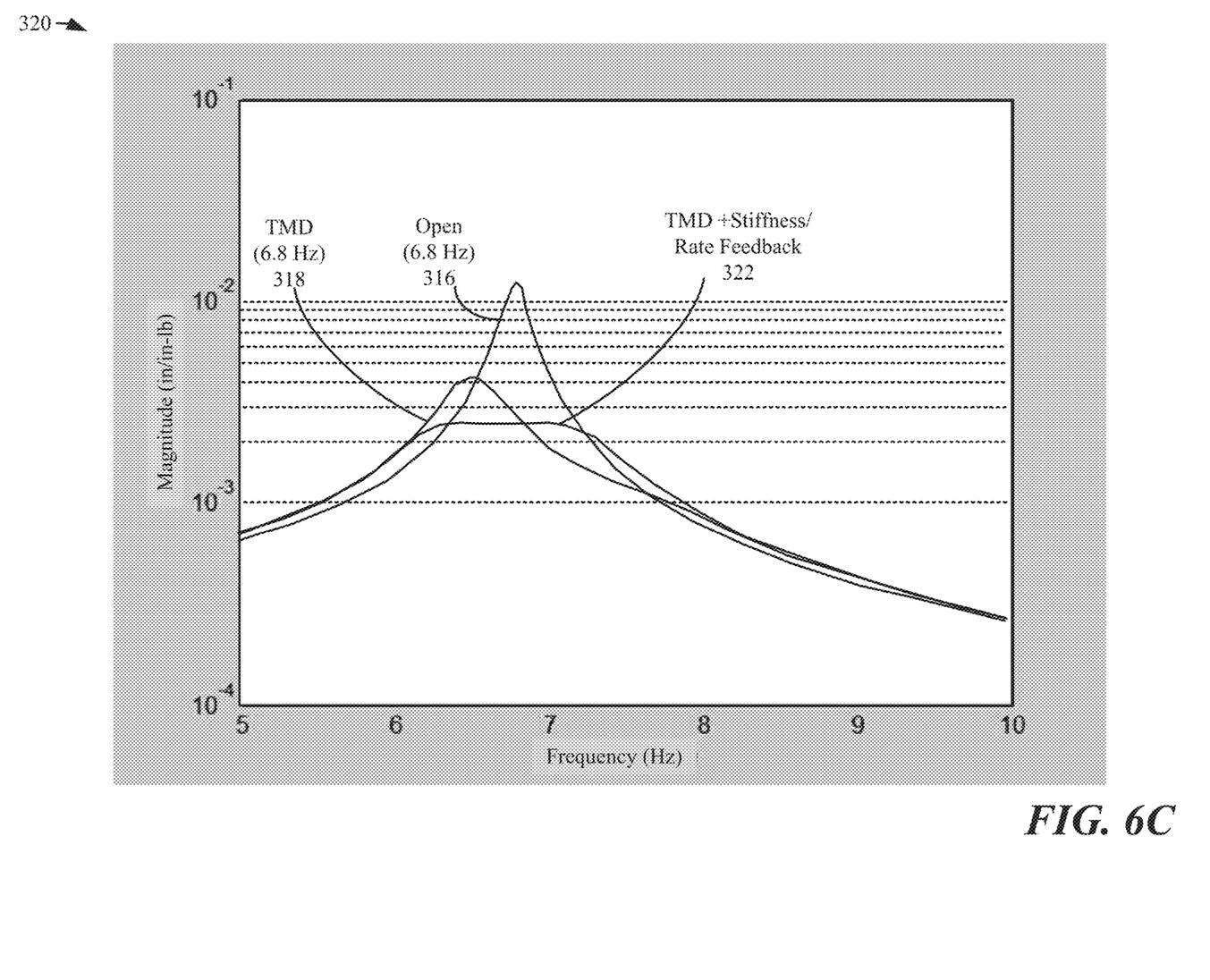

In FIG. 6C, the magnitude versus frequency is again shown. Two curves at 6.8 Hz from FIG. 6B, 316 and 318 are shown. Curve 316 is the model without the TMD. Curve 316 is the model and the TMD where the TMD uses only rate feedback. In curve 322, the control system uses rate and stiffness feedback which are each multiplied by a determined gain. For example, rate and stiffness feedback can be implemented in the manner described above in the previous paragraph. The rate and stiffness feedback improves the damping as compared to using only rate feedback. This approach can be utilized to account to changes in resonant frequency that can occur due to changes in flow velocity during wind tunnel testing including changes that occur during a single test.

Figure 7:
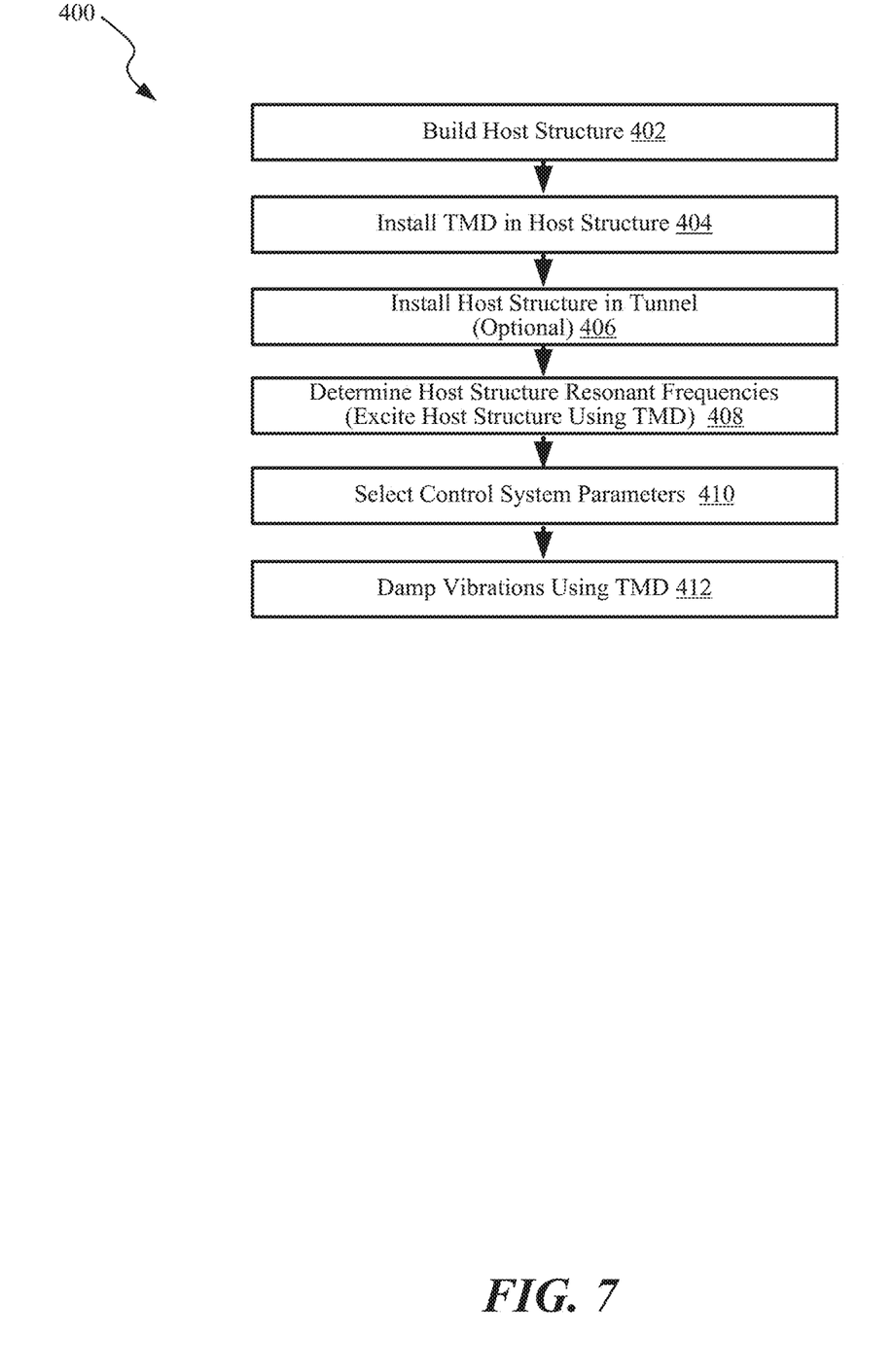
FIG. 7 is a method of using a tuned mass damper on a host structure, according to aspects of the present disclosure.

Next, a method 400 of using a TMD to damp vibrations on a host structure is described. In 402, a host structure can be built. In 404, a TMD including a voice coil can be installed within or can be coupled to the host structure. In one embodiment, the host structure can be a wind tunnel model.

A control system can be included with the TMD. The TMD can utilize rate feedback control, stiffness feedback control, a feedback circuit for keeping motion of the TMD centered about a line and/or combinations thereof. All or a portion of the control system can be installed within or coupled to the host structure. For example, with a wind tunnel model, all or a portion to the control system can be located outside of the wind tunnel model.

In 406, in the case of wind tunnel model, the wind tunnel model can be installed in a wind tunnel. In other embodiments, such as for an airborne platform, this step is not necessary. In 408, host structure resonant frequencies can be determined.

In one embodiment, in 408, the resonant frequencies can be determined via simulations. In another example, a model in wind tunnel can be excited via some mechanism to determine the model resonant frequencies. For example, a weight can be attached to the model and then released. In a particular example, the TMD installed in a wind tunnel model can be excited to shake the wind tunnel model. This excitation input can be used to determine the resonant frequencies of the TMD and model system. When coupled to a host structure, the TMD can be operated to shake the host structure and the TMD to determine resonant frequencies.

In 410, based upon the determined resonant frequencies, control system parameters can be selected. For example, gains for the rate and stiffness feedback loops can be selected. The parameters can be used to configure the control system attached to the TMD. Then, in 412, the TMD can be used to damp vibrations in a host structure in real-time, such as during testing of wind tunnel model in a transonic wind tunnel.

Examples of Aircraft Application

Figure 8:
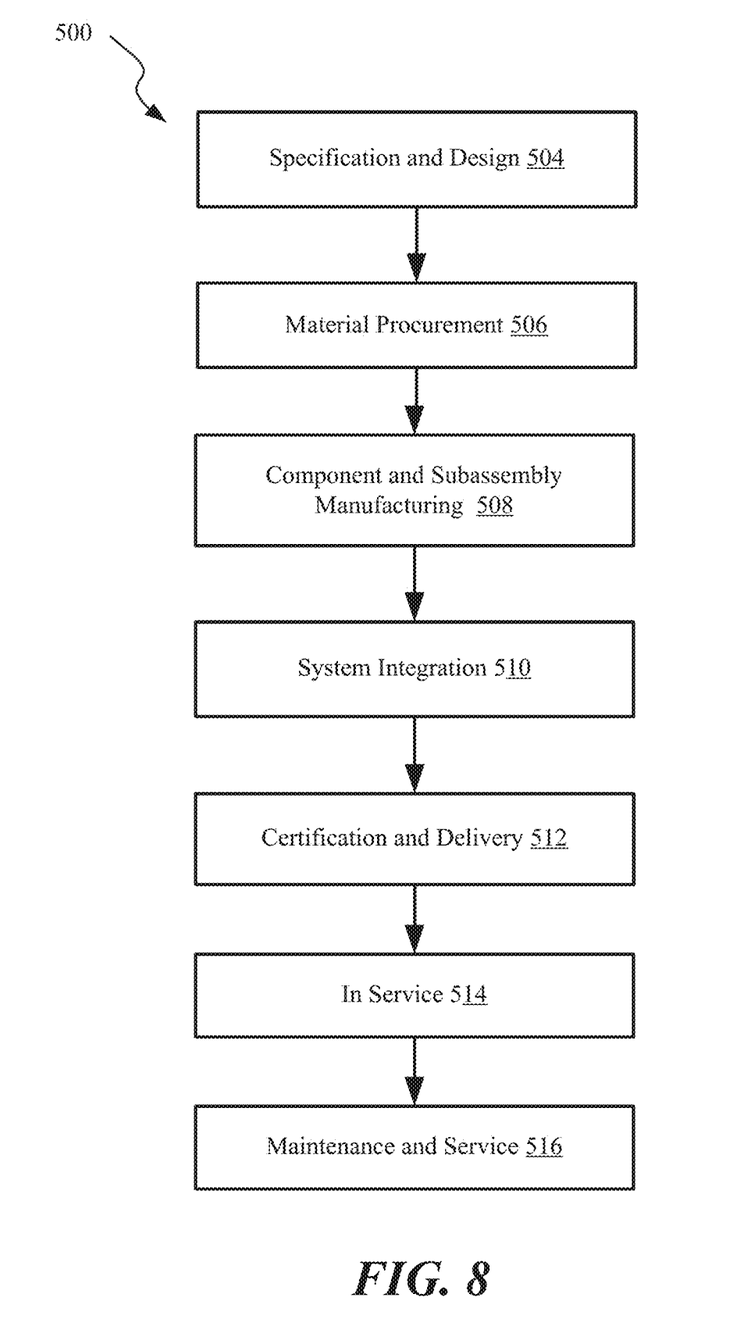
FIG. 8 is a block diagram of an aircraft production and service methodology that may utilize the methods and apparatus described with respect to FIGS. 1-7, according to one aspect of the present disclosure.
Figure 9:
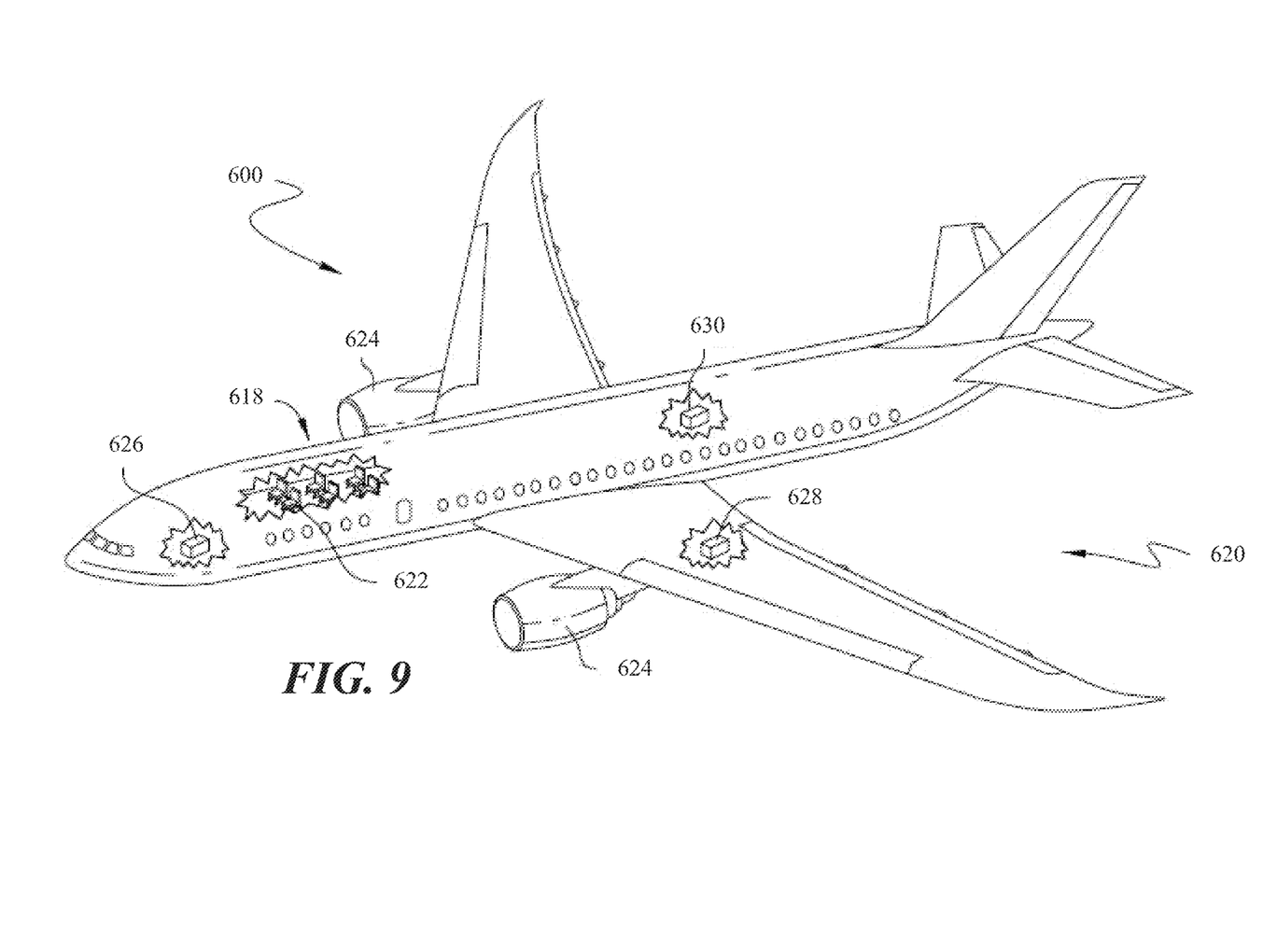
FIG. 9 is a schematic illustration of an aircraft that may utilize the methods and apparatus in accordance with FIGS. 1-7, according to one aspect of the present disclosure.

An aircraft manufacturing and service method 500 shown in FIG. 7 and an aircraft 600 shown in FIG. 8 are now be described to better illustrate various features of processes and systems presented herein. The fuselage cradle support assembly can be used in any stage of the aircraft lifetime, such as prototyping, manufacture, operations and maintenance. As was described above, a cradle support assembly design can be used for supporting other types of objects and is not limited to supporting only an airframe. For example, the cradle support assembly can be used to support a tank or a rocket section during manufacture.

During pre-production, aircraft manufacturing and service method 500 may include specification and design 504 of aircraft 600 and material procurement 506. The production phase involves component and subassembly manufacturing 508 and system integration 510 of aircraft 600. System integration can also occur before material procurement 506. Aspects of the specification and design of an aircraft 600 including wind tunnel testing is described above with respect to FIGS. 1-6C. Thereafter, aircraft 600 may go through certification and delivery 512 in order to be placed in service 514. While in service by a customer, aircraft 600 is scheduled for routine maintenance and service 516 (which may also include modification, reconfiguration, refurbishment, and so on). While the embodiments described herein relate generally to servicing of commercial aircraft, they may be practiced at other stages of the aircraft manufacturing and service method 500.

Each of the processes of aircraft manufacturing and service method 500 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 8, aircraft 600 produced by illustrative method 500 in FIG. 7 may include airframe 618 with a plurality of high-level systems 620 and interior 622. Examples of high-level systems 620 include one or more of propulsion system 624, electrical system 626, hydraulic system 628, and environmental system 630. Any number of other systems may be included. In some embodiments, one or more of these systems can include a TMD to damping vibrations as previously described above. Further, some of the components in these systems can be designed from data derived from wind tunnel testing using a TMD and wind tunnel model in the manner previously described above.

Apparatus and methods shown or described herein may be employed during any one or more of the stages of the aircraft manufacturing and service method 600. For example, components or subassemblies corresponding to component and subassembly manufacturing 608 may be fabricated or manufactured in a manner similar to components or subassemblies produced while aircraft 600 is in service. Also, one or more aspects of the apparatus, method, or combination thereof may be utilized during operations 508 and 510, for example, by substantially expediting assembly of or reducing the cost of aircraft 600. Similarly, one or more aspects of the apparatus or method realizations, or a combination thereof, may be utilized, for example and without limitation, while aircraft 600 is in service, e.g., maintenance and service 516.

CONCLUSION

Different examples and aspects of the apparatus and methods are disclosed herein that include a variety of components, features, and functionality. In particular, apparatus and methods associated with a spoiler system on a wing used on an aircraft are discussed. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:
1. A system comprising:
   a host structure configured to receive a periodic external load;
   a tuned mass damper, coupled to the host structure, including
      a frame;
      a voice coil configured to receive current;
      a suspended mass including a magnet configured to move in response to the current moving through the voice coil;

a suspension system which couples the suspended mass to the frame; and a displacement sensor configured to measure an amount of displacement of the suspended mass; and a control system configured to receive sensor data from the displacement sensor and use the displacement sensor data to control the current in the voice coil to damp structural vibrations associated with the host structure.

2. The system of claim 1, wherein the host structure is a wing on airplane and the periodic external load is an aerodynamic load that occurs during flight.

3. The system of claim 1, wherein the host structure is a wind tunnel model and the periodic external load is an aerodynamic load during a wind tunnel test.

4. The system of claim 3, wherein a speed of sound is exceeded locally on the wind tunnel model during the wind tunnel test.

5. The system of claim 3, wherein the tuned massed damper is mounted internally in the wind tunnel model.

6. The system of claim 5, wherein the tuned massed damper is mounted forward of wings of the wind tunnel model.

7. The system of claim 3, wherein a resonant frequency of the wind tunnel model changes as the aerodynamic load changes and wherein the control system is configured to change movement characteristics of the suspended mass in response to the changes in the resonant frequency of the wind tunnel model.

8. The system of claim 1, wherein a resonant frequency of the host structure changes as the periodic external load changes and wherein the control system is configured to change movement characteristics of the suspended mass in response to the changes in the resonant frequency of the host structure.

9. The system of claim 1, wherein the control system further includes an amplifier which supplies the current to the voice coil.

10. The system of claim 1, wherein the suspension system includes a plurality of elastic flexures which couple the suspended mass to the frame.

11. The system of claim 1, wherein the suspension system includes one or more springs which couple the suspended mass to the frame.

12. The system of claim 1, wherein the control system is configured to control the tuned mass damper to vibrate with random frequencies to shake the host structure to determine one or more resonant frequencies of the host structure.

13. The system of claim 1, wherein the control system is configured to keep a movement of the suspended mass centered around a position.

14. The system of claim 13, the control system further comprising a proportional integral loop coupled to the displacement sensor configured to keep the movement of the suspended mass centered.

15. An aerodynamic system comprising:
a wind tunnel model configured to receive an aerodynamic load;
a tuned mass damper, coupled to the wind tunnel model and disposed within an interior of the wind tunnel model, including
a frame;
a voice coil configured to receive current;
a suspended mass including a magnet configured to move in response to the current moving through the voice coil;
a suspension system which couples the suspended mass to the frame; and
a displacement sensor configured to measure an amount of displacement of the suspended mass; and
a control system configured to receive sensor data from the displacement sensor and use the displacement sensor data to control the current in the voice coil to damp structural vibrations associated with the wind tunnel model.

16. The aerodynamic system of claim 15, further comprising a support system coupled to the wind tunnel model configured to support the wind tunnel model within a test chamber of the wind tunnel.

17. The aerodynamic system of claim 15, wherein the wind tunnel model is an airplane.

18. The aerodynamic system of claim 15, wherein the tuned mass damper and control system are configured to damp structural vibrations in the wind tunnel model resulting from limit-cycle oscillations at transonic Mach numbers.

19. A method comprising:
operating a wind tunnel including a wind tunnel model mounted to a support system in the wind tunnel to generate air flow over the wind tunnel model wherein the wind tunnel model includes a tuned mass damper mounted within the interior of wind tunnel model; and
controlling the tuned mass damper during wind tunnel tests to damp structural vibrations in the wind tunnel model.

20. The method of claim 19 wherein during the wind tunnel is configured to generate a local Mach number on the wind tunnel model which exceeds a speed of sound.

21. The method of claim 19 further comprising controlling the tuned mass damper to account for changes to a resonant frequency of the model that result from a change of an angle of attack of the wind tunnel model or a change in velocity in the wind tunnel during the operating.

22. The method of claim 19 further comprising prior to operating the wind tunnel to generate the air flow, controlling the tuned mass damper to shake the wind tunnel model to determine resonant frequencies associated with the wind tunnel model and in response adjusting control parameters associated with the tuned mass damper to improve damping at the resonant frequencies.

* * * * *